United States Patent
Jackson

(10) Patent No.: US 8,840,255 B2
(45) Date of Patent: Sep. 23, 2014

(54) SCANNED BEAM INTENSITY MODULATION USING AMPLITUDE AND DRIVE DUTY CYCLE

(71) Applicant: Microvision, Inc., Redmond, WA (US)

(72) Inventor: Robert James Jackson, Monroe, WA (US)

(73) Assignee: Microvision, Inc., Redmond, WA (US)

( * ) Notice: Subject to any disclaimer, the term of this patent is extended or adjusted under 35 U.S.C. 154(b) by 211 days.

(21) Appl. No.: 13/650,768

(22) Filed: Oct. 12, 2012

(65) Prior Publication Data

US 2014/0104501 A1  Apr. 17, 2014

(51) Int. Cl.
*G03B 21/28* (2006.01)

(52) U.S. Cl.
USPC ............ 353/99; 353/30; 353/31; 353/37; 353/85; 353/94; 372/29.014; 372/29.015; 372/29.016

(58) Field of Classification Search
CPC ........... G02B 6/12004; G02B 6/12007; G02B 6/12019; G02B 6/12023; G02B 6/12033; H04N 2201/04729; H04N 2201/04789; H04N 9/3129; G09G 3/025; G09G 3/346
USPC .............................. 353/30, 31, 37, 85, 94, 99; 372/29.014–29.016, 30–32; 348/743–747; 359/196.1, 198.1, 224.1, 359/384
See application file for complete search history.

(56) References Cited

U.S. PATENT DOCUMENTS

| 7,511,771 | B2 | 3/2009 | Stern et al. | |
|---|---|---|---|---|
| 8,746,898 | B2 * | 6/2014 | Miller et al. | 353/99 |
| 2008/0013881 | A1 * | 1/2008 | Welch et al. | 385/14 |
| 2008/0144150 | A1 | 6/2008 | Champion et al. | |
| 2009/0161707 | A1 | 6/2009 | Champion et al. | |
| 2010/0283413 | A1 * | 11/2010 | Richter et al. | 315/360 |
| 2011/0128507 | A1 * | 6/2011 | Suzuki et al. | 353/31 |
| 2011/0205498 | A1 * | 8/2011 | Brown et al. | 353/31 |
| 2012/0169752 | A1 | 7/2012 | Kurozuka | |
| 2012/0293783 | A1 * | 11/2012 | Ishida et al. | 355/67 |

FOREIGN PATENT DOCUMENTS

JP  2006-323355  11/2006

OTHER PUBLICATIONS

Microvision, , "International Search Report and Written Opinion", PCT/US2013/061716 International Search Report and Written Opinion.

* cited by examiner

*Primary Examiner* — Sultan Chowdhury
(74) *Attorney, Agent, or Firm* — Kevin D. Wills

(57) ABSTRACT

A scanning laser projector includes a scanning mirror that moves in a sinusoidal motion on at least one axis. Pixels are displayed by modulating a laser beam that is reflected by the scanning mirror. Pixels are generated using light pulses of different duty cycles based on the position and/or angular velocity of the laser beam.

20 Claims, 12 Drawing Sheets

US 8,840,255 B2

SCANNED BEAM INTENSITY MODULATION USING AMPLITUDE AND DRIVE DUTY CYCLE

FIELD

The present invention relates generally to scanning projectors, and more specifically to light modulation in scanning projectors.

BACKGROUND

In scanned beam projection systems, it is common to create output pixel drive signals using a digital-to-analog converter (DAC) operating with a fixed frequency DAC clock. To obtain proportional dimensions of each point of projected light, "spatial pixels" that are of the same spatial dimension occupy a changing discrete quantity of DAC clock periods as viewed in the time domain. This is due to the changing velocity of a sinusoidally scanning mirror. For example, each output spatial pixel is created from one, two, or more, periods of the DAC clock. Typically, the output light for a given point (output spatial pixel) is modulated to a fixed amplitude for the duration of the required DAC clock periods. As the scanning mirror sweeps, the minimum output pixel width (in terms of DAC clock periods) occurs at the center of the scan region where the beam's angular velocity is highest. As the beam moves towards the edges of its sinusoidal sweep, output spatial pixels are mapped to larger numbers of discrete DAC clock periods.

DESCRIPTION OF EMBODIMENTS

Figure 1:
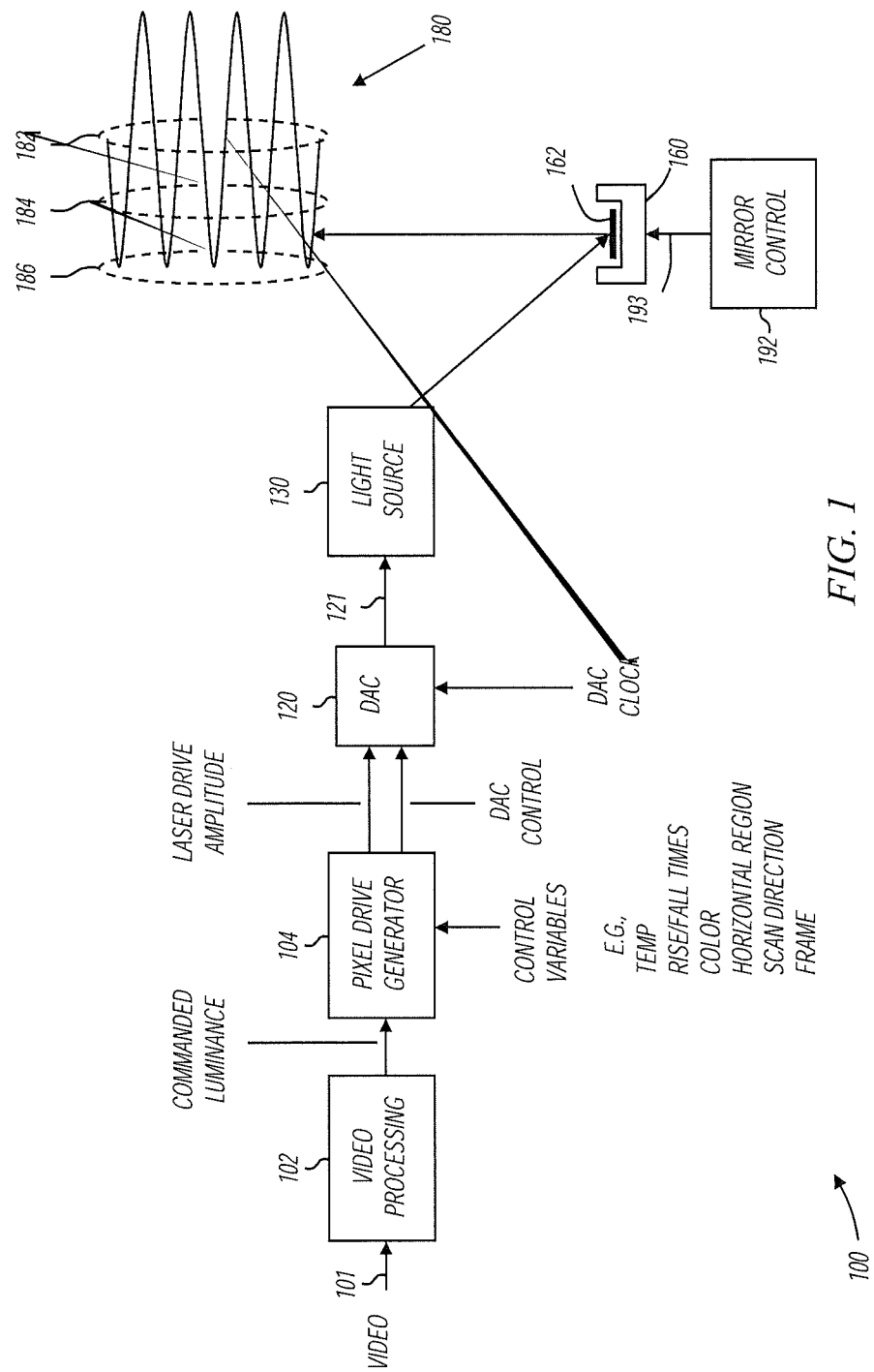
FIG. 1 shows a scanning projector with a pixel drive generator in accordance with various embodiments of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a scanning projector with a pixel drive generator in accordance with various embodiments of the present invention. Projector 100 includes video processing component 102, pixel drive generator component 104, digital-to-analog converter (DAC) 120, light source 130, microelectromechanical machine (MEMS) device 160 having scanning mirror 162, and mirror control circuit 192.

In operation, video processing component 102 receives video data on node 101 and produces display pixel data representing commanded luminance values of pixels that are to be displayed. The video data 101 represents image source data that is typically received with pixel data on a rectilinear grid, but this is not essential. For example, video data 101 may represent a grid of pixels at any resolution (e.g., 640×480, 848×480, 1280×720, 1920×1080). The input light intensity encoding typically represents the light intensity in 8, 10, 12 bit or higher resolutions.

Projection apparatus 100 is a scanning projector that scans a raster pattern. The raster pattern does not necessarily align with the rectilinear grid in the image source data, and video processing component 102 operates to produce display pixel data that will be displayed at appropriate points on the raster pattern. For example, in some embodiments, video processing component 102 interpolates vertically and/or horizontally between pixels in the source image data to determine display pixel values along the scan trajectory of the raster pattern.

Video processing component 102 may include any circuitry capable of performing the functions described. For example, in some embodiments, video processing component 102 includes digital circuits capable of performing interpolation such as multipliers, shifters, and adders. Also for example, in some embodiments, video processing component 102 may include hardware circuits and may also include a processor that executes instructions.

Pixel drive generator component 104 receives commanded luminance values from video processing component 102, and maps the luminance values to digital drive values and DAC control values which control both amplitude and duration of resulting light pulses used to produce display pixels. In some embodiments, pixel drive generator component 104 includes a look-up table that maps luminance values to digital drive values. Further, in some embodiments, pixel drive generator component 104 includes circuitry to generate DAC control signals based on the commanded luminance as well as other control variables. Example control variables include, but are not limited to, temperature, laser diode rise and fall times, color, current horizontal scan region, scan direction, video frame, video line, and the like.

Pixel drive generator component 104 may include any circuitry capable of performing the functions described. For example, in some embodiments, pixel drive generator component 104 includes digital circuits capable of transforming the commanded luminance into amplitude/duration pairs, such as multipliers, shifters, adders, and look-up tables implemented with memory devices. Also for example, in some embodiments, pixel drive generator component 104 may include hardware circuits and may also include a processor that executes instructions.

Digital-to-analog converter (DAC) 120 converts digital laser drive amplitude values to analog currents. DAC 120 receives a fixed frequency DAC clock, laser drive amplitude values, and DAC control signals. The DAC clock may be sourced by any suitable circuit, such as a phase locked loop (PLL). The term "fixed frequency" is used herein to describe a clock signal that has a frequency that may vary slightly based on many factors, including but not limited to PLL variations, oscillator phase noise, mechanical vibrations, and the like. The period of the DAC clock is referred to herein as the "DAC clock period."

In some embodiments, the DAC control signals received from pixel drive generator include one or more signals to control the duty cycle of the resulting laser drive signal produced by DAC 120. For example, pixel drive generator 104 may provide a return-to-zero (RTZ) signal to DAC 120 to allow for laser drive times that are less than the DAC clock period. The RTZ signal may also provide for fine control of the horizontal spatial position of display pixels.

Light source 130 receives drive current signals from DAC 120 and produces light having grayscale values in response thereto. Light source 130 may be monochrome or may include multiple different color light sources. For example, in some embodiments, light source 130 includes red, green, and blue light sources. In these embodiments, video processing component 102 outputs display pixel data corresponding to each of the red, green, and blue light sources. Also for example, light produced by light source 130 may be visible or nonvisible. For example, in some embodiments, one or more sources of light within light source 130 may produce infrared (IR) light. In some embodiments, light source 130 may include one or more laser light producing devices. For example, in some embodiments, the light source 130 may include laser diodes.

The light from light source 130 is directed to scanning mirror 162. In some embodiments, additional optical elements are included in the light path between light source 130 and scanning mirror 162. For example, projector 100 may include collimating lenses, dichroic mirrors, or any other suitable optical elements.

Scanning mirror 162 deflects on two axes in response to electrical stimuli received on node 193 from mirror control circuits 192. While moving on the two axes, scanning mirror 162 reflects modulated light provided by light source 130. The reflected light sweeps a raster pattern and creates a resultant display in an image plane at 180. The shape of the raster pattern swept by scanning mirror 162 is a function of the mirror movement on its two axes. For example, in some embodiments, scanning mirror 162 sweeps on a first axis (e.g., vertical dimension) in response to sawtooth wave stimulus, resulting in a substantially linear and unidirectional vertical sweep. Also for example, in some embodiments, scanning mirror 162 sweeps on a second axis (e.g., horizontal dimension) according to a sinusoidal stimulus, resulting in a substantially sinusoidal horizontal sweep.

MEMS device 160 is an example of a scanning mirror assembly that scans light in two dimensions. In some embodiments the scanning mirror assembly includes a single mirror that scans in two dimensions (e.g., on two axes). Alternatively, in some embodiments, MEMS device 160 may be an assembly that includes two scan mirrors, one which deflects the beam along one axis, and another which deflects the beam along a second axis largely perpendicular to the first axis.

The resultant display at 180 highlights various regions of the raster scan in the horizontal dimension for further discussion. The center of the horizontal scan located in the middle of its sinusoidal motion is shown as region 182. Region 182 is the region of highest horizontal angular velocity of scanning mirror 162. Region 184 is a region of lower horizontal angular velocity of scanning mirror 162, closer to the apex of the sinusoidal motion than region 182. Region 186 is the region of lowest horizontal angular velocity of scanning mirror 162. Pixels are typically not displayed in region 186, which represents the projection limits at the right and left extremes of horizontal motion, typically set to 0.94 times the peak amplitude of sinusoid angular excursion.

In operation, pixel drive generator component 104 selects the closest DAC clock period(s) or fractional period that corresponds to the correct angular output pixel. Based on the number of DAC clock periods selected, the laser drive amplitude may also be modified. For example, if a fractional DAC clock period is selected, the amplitude may be increased accordingly. DAC clock period selection and drive amplitude modification may also be influenced by input information (control variables) such as temperature, laser characteristics, color, frame count and projection region. Based on these inputs and others, pixel drive generator component 104 determines the correct amplitude/duration output to achieve a monotonic input code to light intensity output relationship. Temperature information allows for compensation of laser output variation as a function of temperature. Accounting for laser light source characteristics such as rise and fall times allow for correct adjustments of amplitude/duration to achieve high resolution. Frame count can allow for alternating overlap of discrete duration transitions that reduce perception of discrete duration transition artifacts. Line count (similar to frame count) allows for a pseudo-random dithering of the exact horizontal position (spatial pixel) of the transition amplitude step. This aids in reducing any perceived image artifacts that may occur due to non-ideal laser drive components. Knowledge of projection region can allow for spatial pixel placement adjustment to enhance overall projection quality.

When an output spatial pixel is composed of more than one DAC clock period, various embodiments of the present invention drive light source 130 at a higher amplitude for one DAC clock period and not drive for the remaining DAC periods assigned to that output spatial pixel. This method is valuable in part because laser diodes operate at a higher conversion efficiency (electrical input power to light power output) when driven at higher amplitudes. Using the techniques described herein the various embodiments of the present invention modulate the light intensity by reducing the pulse width either in discrete intervals (DAC clock periods) or smaller increments that are fractional DAC clock periods and increasing the drive amplitude to achieve the same output pixel light intensity.

Although this discussion focuses on pixel drive durations of integer DAC clock periods and half DAC clock periods, this is not a limitation of the present invention. For example, some embodiments divide the DAC clock period into four, eight, 16, or more fractional increments of the primary DAC clock period. The desired output light intensity for an output projected pixel can be achieved by computing a pulse width in combination with a current drive amplitude. This approach can achieve a high resolution of light intensity from a combination of lower resolution amplitude and pulse width drive codes.

Figure 2:
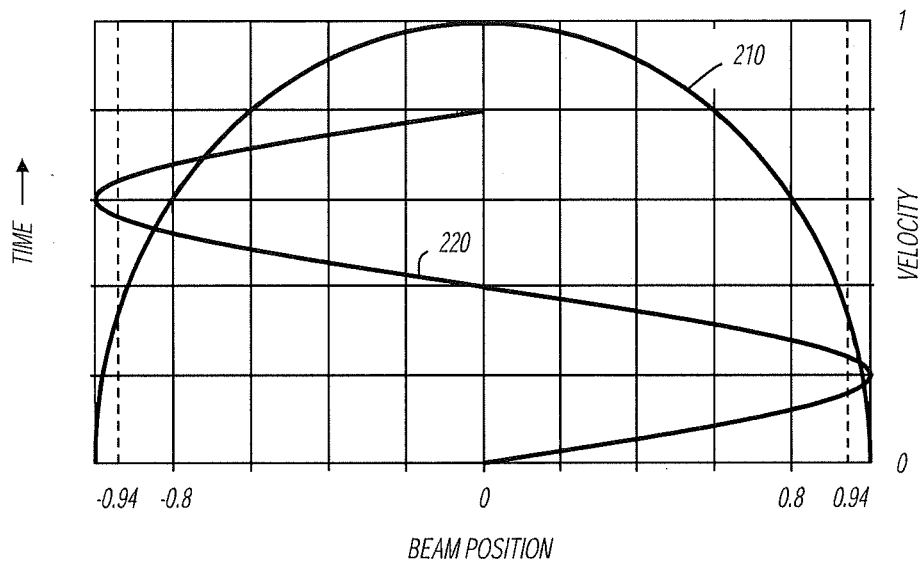
FIG. 2 shows a sinusoidal horizontal scan trajectory and a beam velocity as a function of beam position in accordance with various embodiments of the present invention.

FIG. 2 shows a sinusoidal horizontal scan trajectory and a beam velocity as a function of beam position in accordance with various embodiments of the present invention. Horizontal scan trajectory 220 is shown with the X axis being the position (pointing angle) and time on the Y axis. Normalized beam velocity 210 is shown with the X axis being the beam position and velocity on the Y axis. As shown in FIG. 2, the peak velocity occurs in the middle of the horizontal scan and the lowest velocity occurs at the extents of the horizontal scan. Typically, input video information is encoded in a linear rectangular format where each pixel represents a fixed horizontal and vertical position with constant dimensional increment between pixels. In scanned beam projection, the linear input is mapped to a linear increment in scan angle. For the vertical scan that is a linear ramp of constant velocity, the mapping is a simple scaling of the image dimension onto the desired projection angle since a vertical increment corresponds to constant increment in time. However, for the horizontal motion, the velocity is not constant and decreases as the scan approaches the apex of the sinusoidal motion. To obtain a mapping of input image content that is represented in rectangular coordinates to an equal number of dimensional "pixels" in a horizontal scan requires dividing the scan into equal increments of angle. For example, FIG. 2 shows a horizontal projection region of +/−0.94 angular units. If a total of 1280 output (projected) pixels are desired, each output pixel would occupy (2*0.94)/1280=0.00146 angular units.

However, for horizontal motion, the incremental angular unit does not occupy a constant interval in time due to the decreasing horizontal velocity of scanning mirror 162 (FIG. 1). As can be seen in FIG. 2, at the edges of projection, the normalized mirror velocity is about 0.35—significantly slower than at the center of the horizontal scan.

Various embodiments of the present invention reduce the duty cycle of the laser drive signals as the beam position moves away from the center of the horizontal scan. In some embodiments, the amplitude of the laser drive signals is increased to compensate for the decrease in duty cycle. Various embodiments of laser drive signal duty cycles and amplitudes as a function of beam position are described below with reference to FIGS. 4-9.

Figure 3:
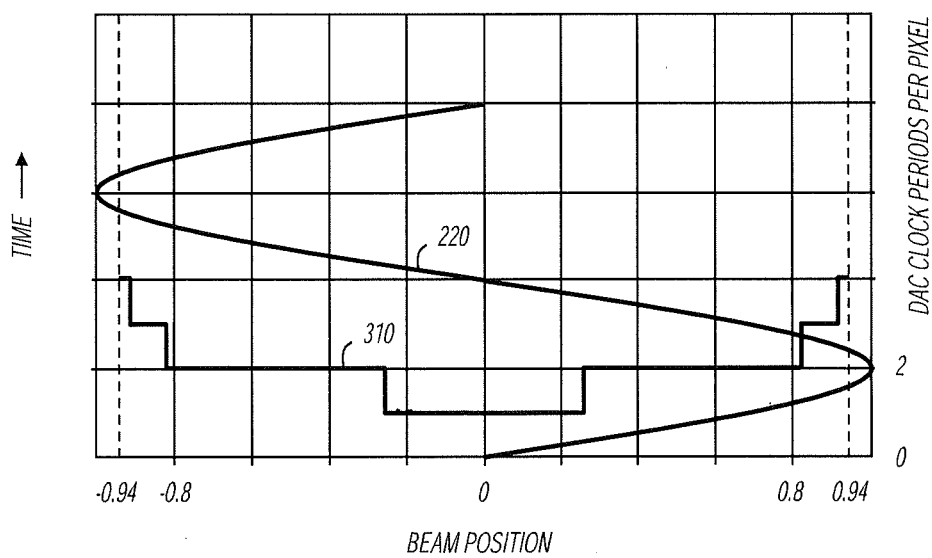
FIG. 3 shows a number of DAC clock periods occupied by an output pixel as a function of beam position in accordance with various embodiments of the present invention.

FIG. 3 shows a number of DAC clock periods occupied by an output pixel as a function of beam position in accordance with various embodiments of the present invention. Horizontal scan trajectory 220 is shown with the X axis being the position (pointing angle) and time on the Y axis. DAC clock periods per pixel 310 is shown with the X axis being the beam position and DAC clock periods on the Y axis. As shown in FIG. 3, the number of DAC clock periods per pixel increases as a function of increasing angular position. In a scanning mirror projection system with a fixed (constant) DAC sample clock, the duration of a unit angular output pixel increases at the edges of the scanning region. Since the shortest time duration output pixel occurs in the center, this region establishes the ratio of input to output addressable pixels. In some embodiments, the input image is oversampled meaning that one input pixel (in the horizontal center) corresponds to greater than one DAC clock period. For example, as described below with reference to FIG. 4, the input image may be oversampled by about 1.5 DAC clock periods per output pixel in the center.

Since DAC samples are discrete intervals and not continuously variable, a mapping of the output pixel can be assigned to discrete integer periods of the DAC clock. However, since the DAC clock period is not always an integer number (one or greater) of angular output pixels, dimensional errors accrue. Various embodiments of the present invention select the closest number of DAC clock period(s) that corresponds to the correct angular output pixel. (E.g., closest laser drive centroid to output pixel centroid). By utilizing this method, allowance is made to not drive the laser for numerous DAC clock periods over the horizontal scan while retaining full output resolution. Additionally, to maintain equivalent image brightness, the fewer DAC sample periods that are actively driven, are pulsed to higher amplitude where the laser operates at higher efficiency.

In some embodiments, the points at which transitions occur are varied to reduce potential image artifacts. For example, in FIG. 3, a transition from one to two DAC clock periods per pixel occurs at about abs (0.25). For a 720p projection image that has 1280 horizontal pixels, this transition occurs at about the 170th pixel from center. In some embodiments, a random seed with maximum amplitude of 10 pixels dithers the exact transition from 160 to 180 pixels. Each horizontal scan line would then have a unique (within a specified range) transition position. This is an example of pixel drive generator component 104 (FIG. 1) using a control variable (line number, random seed) to determine the laser drive amplitude and DAC control signals.

Figure 4:
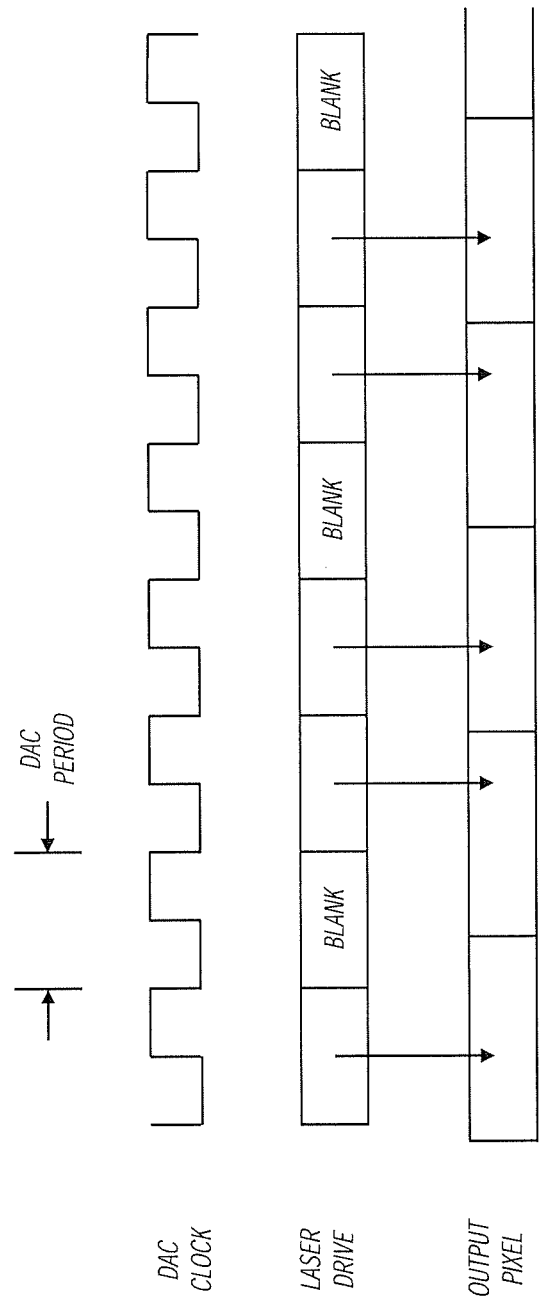
FIG. 4 shows laser drive signal generation at the maximum beam velocity in accordance with various embodiments of the present invention.

FIG. 4 shows laser drive signal generation at the maximum beam velocity in accordance with various embodiments of the present invention. In embodiments represented by FIG. 4, the input image is oversampled by a factor of 1.5. That is, there are 1.5 DAC clock periods per output pixel. In some embodiments, output pixels as shown in FIG. 4 have a one-to-one correspondence with input pixel, so horizontal interpolation is not needed.

As can be seen in FIG. 4, the centroid of laser drive positional error reduces as the oversampling ratio increases. However, there is no accumulation of output pixel positional error which averages to zero over several pixels. The maximum positional error for a given pixel is proportional to the instantaneous oversampling ratio. The method can be enhanced in embodiments in which the DAC has the ability to blank its output for fractions of a DAC clock period. This behavior is implemented as a Return-To-Zero (RTZ) function in commercially available laser driver DACs. One example is the ISL 58315 from Intersil Corporation of Milpitas, Calif.

In embodiments with an oversampling ratio of 1.5 in the center, the maximum duty cycle is ⅔ at the point of highest horizontal beam velocity. As the beam moves from the center and the velocity slows, the duty cycle is reduced. This is shown in FIG. 5.

Figure 5:
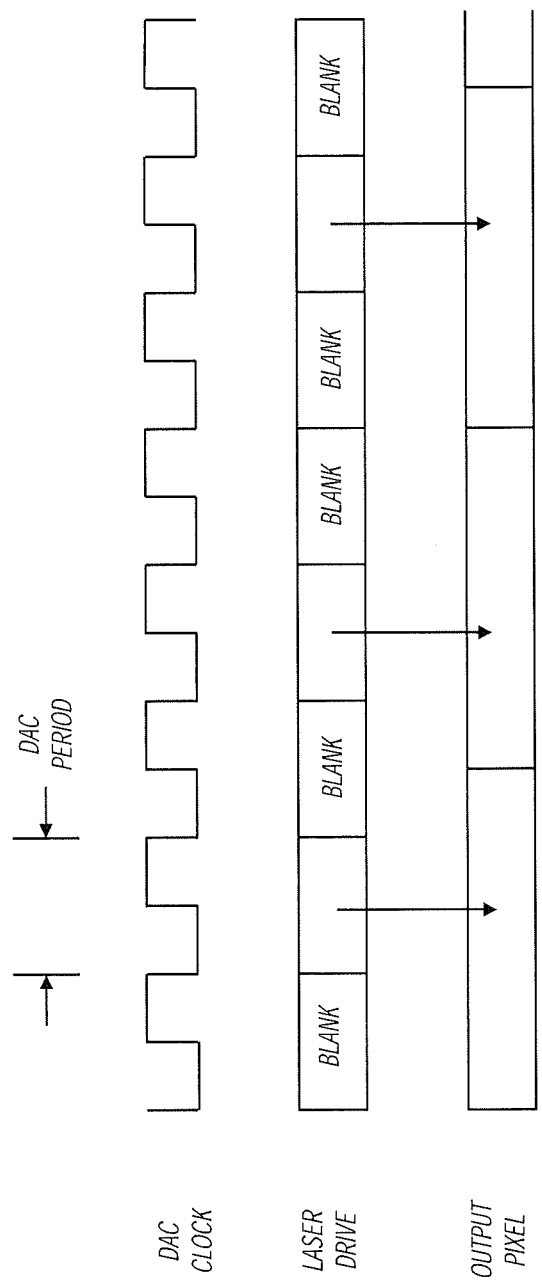
FIG. 5 shows laser drive signal generation at a reduced beam velocity in accordance with various embodiments of the present invention.

FIG. 5 shows laser drive signal generation at a reduced beam velocity in accordance with various embodiments of the present invention. FIG. 5 generally represents operation in region 184 (FIG. 1), where the beam velocity is no longer at a maximum. In the example of FIG. 5, the beam velocity has slowed to the point that the oversampling ratio is substantially 2.5. This results in the duty cycle being lowered to about 0.4

Figure 6:
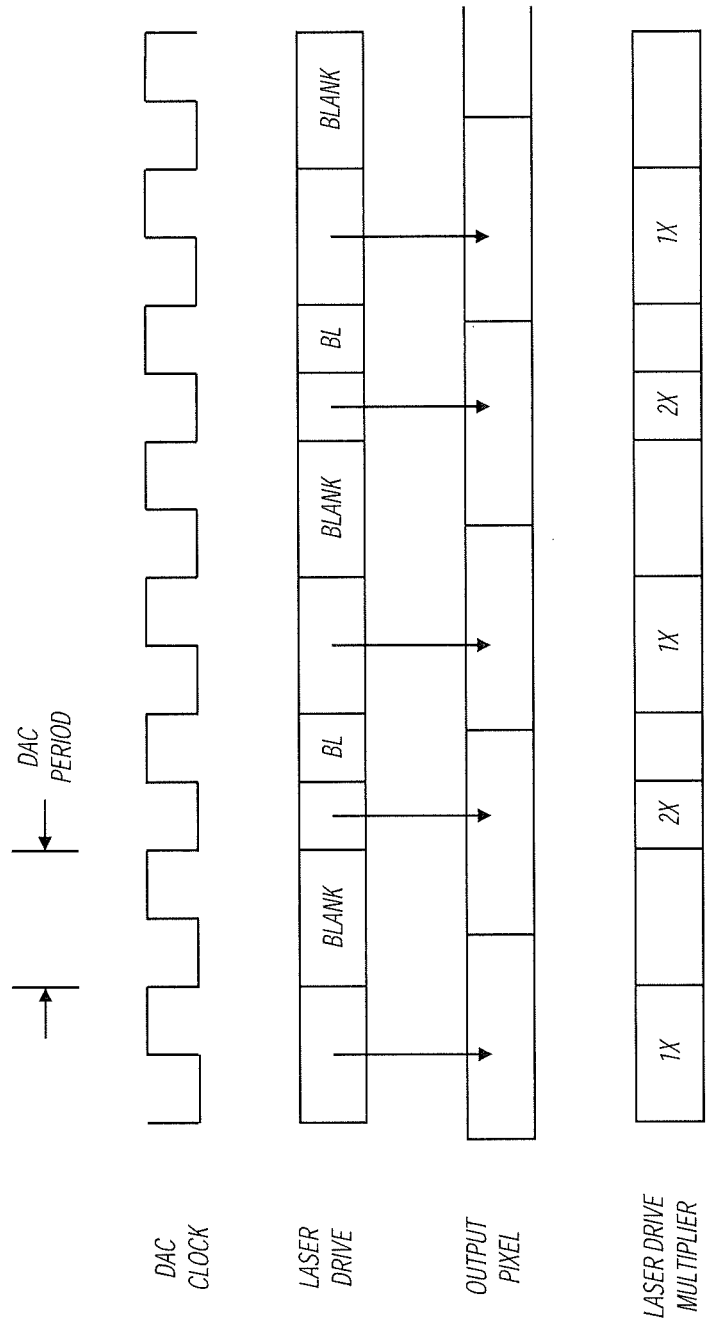
FIG. 6 shows laser drive signal generation with blanking of the last half of DAC clock periods in accordance with various embodiments of the present invention.

FIG. 6 shows laser drive signal generation with blanking of the last half of DAC clock periods in accordance with various embodiments of the present invention. The example shown in FIG. 6 is implemented when the driver blanks its laser drive for the last ½ DAC clock period. Some pixels are driven for a full DAC clock period, and other pixels are driven for ½ DAC clock period. This allows for better spatial alignment of output pixels. Note that output pixels driven for half as long are driven at twice the amplitude. The decision regarding the time duration and the amplitude multiplier is made by pixel drive generator component 104 (FIG. 1) in response to the information provided as shown in FIG. 1.

Figure 7:
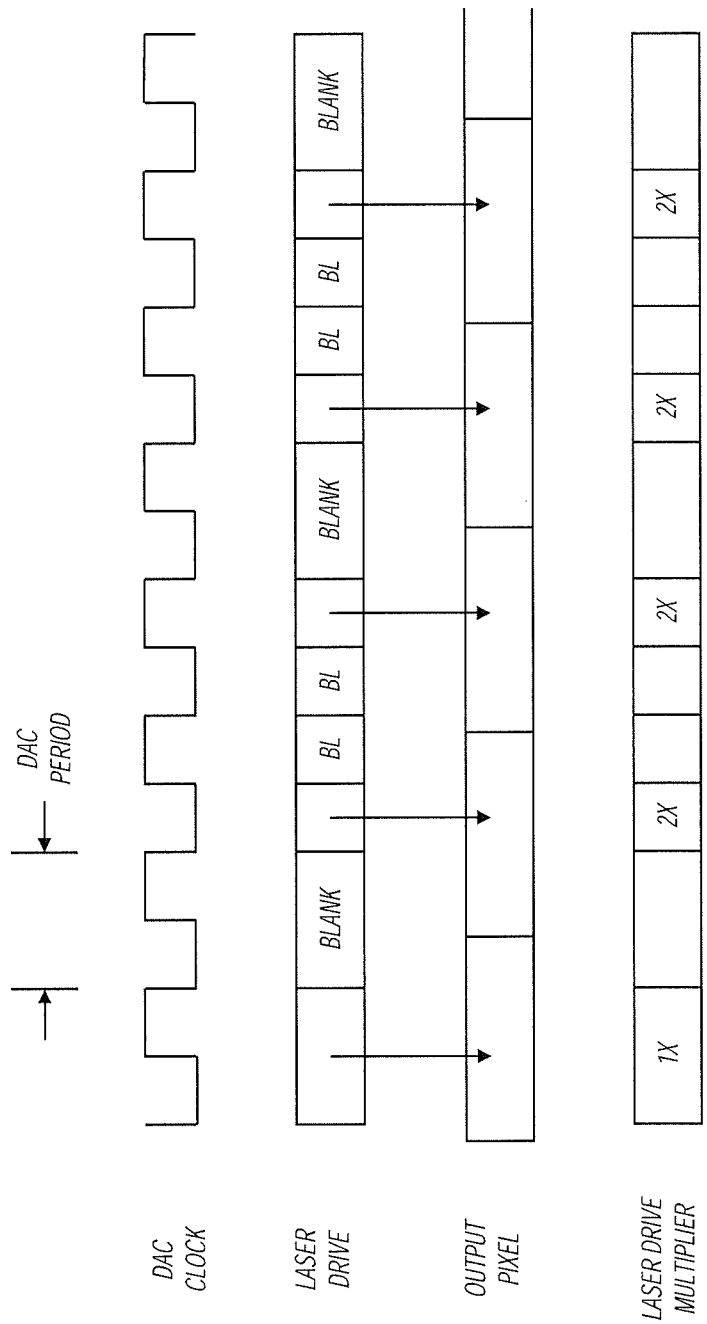
FIG. 7 shows laser drive signal generation with blanking of the first half and last half of DAC clock periods in accordance with various embodiments of the present invention.

FIG. 7 shows laser drive signal generation with blanking of the first half and last half of DAC clock periods in accordance with various embodiments of the present invention. FIG. 7 shows another implementation, the driver can be commanded to blank for either the first half or last half which can further decrease the positional error. Note that drive values are still multiplied up when driving for a shorter duration.

Figure 8:
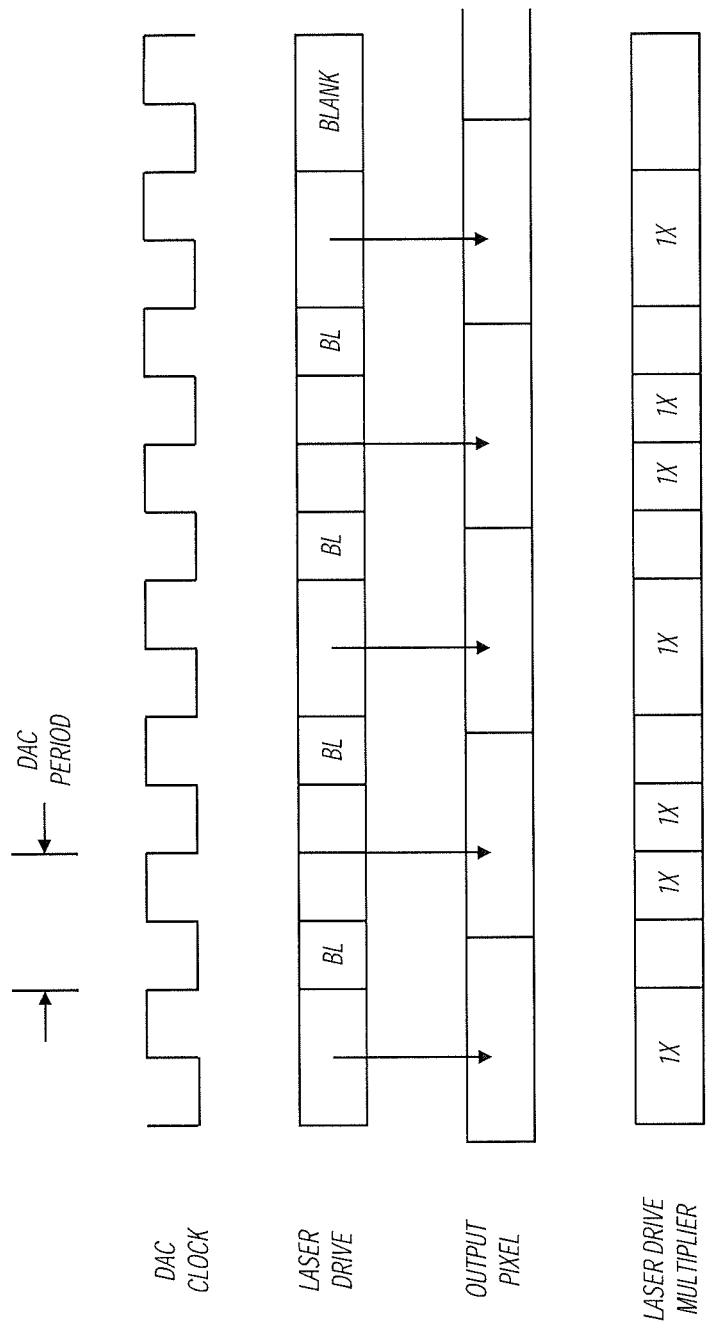
FIGS. 8 and 9 show laser drive signal generation with blanking of the first half and last half of DAC clock periods while maintaining a unity drive multiplier in accordance with various embodiments of the present invention.
Figure 9:
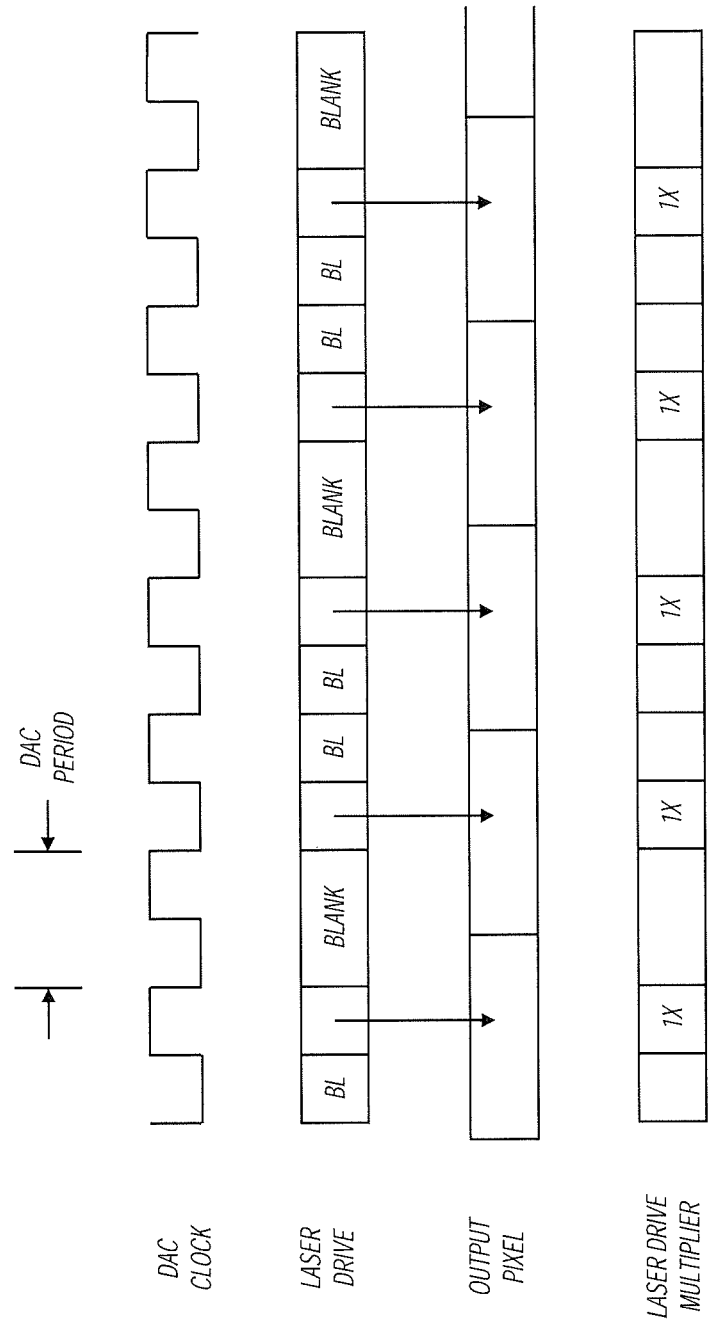

FIGS. 8 and 9 show laser drive signal generation with blanking of the first half and last half of DAC clock periods while maintaining a unity drive multiplier in accordance with various embodiments of the present invention. In FIG. 8, the drive duration is always equal to one DAC clock period. RTZ functionality is used to blank the laser drive in either the first or last half of the DAC clock period but constant amplitude is maintained by joining two adjacent ½ DAC clock periods. In FIG. 9, the drive duration is always equal to one half DAC clock period. RTZ functionality is used to blank either the first or last half of the DAC clock period but retains constant amplitude drive by joining two adjacent ½ DAC clock periods. In embodiments represented by FIGS. 4-9, horizontal interpolation may be used to mitigate the perception of output pixel position error, sending positionally corrected data to the DAC clock period being driven; however, in some embodiments, only vertical interpolation is used.

Figure 10:
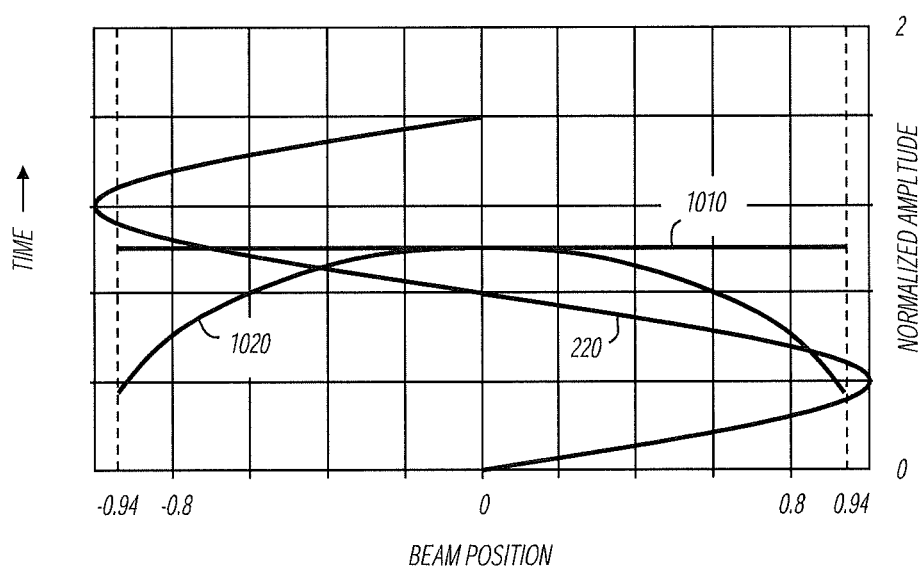
FIG. 10 shows normalized amplitude drive signal values in accordance with various embodiments of the present invention.
Figure 11:
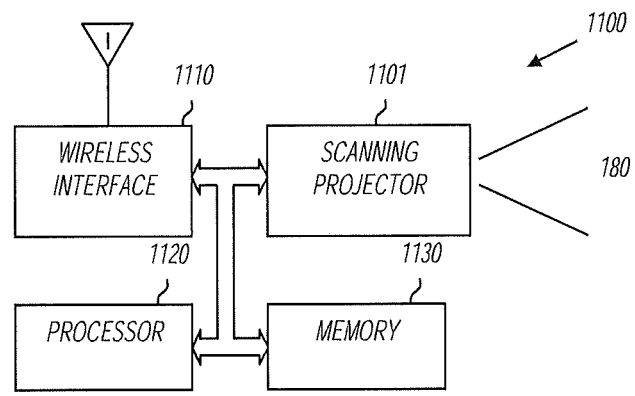
FIG. 11 shows a block diagram of a mobile device in accordance with various embodiments of the present invention.

FIG. 10 shows normalized amplitude drive signal values in accordance with various embodiments of the present invention. 1020 shows the normalized amplitude drive required for a constant intensity in a system where interpolation is used and all DAC clock periods are driven across a horizontal line. As can be seen, the drive amplitude is intentionally decreased as the scanning mirror horizontal velocity diminishes because more DAC clock periods compose each output pixel. In the examples shown in FIGS. 4, 5, 8, and 9, since each desired output pixel corresponds to only one laser drive DAC clock period, the drive amplitude does not have to change over the entire horizontal sweep. This is shown at 1010 in FIG. 10 where the normalized amplitude is always one. This is beneficial since it helps maintain dynamic range of the laser driver. In the examples of FIGS. 6 and 7, the normalized amplitude alternates between 1× and 2× in a pattern.

FIG. 1 shows a block diagram of a mobile device in accordance with various embodiments of the present invention. As shown in FIG. 1, mobile device 1100 includes wireless interface 1110, processor 1120, memory 1130, and scanning projector 1101. Scanning projector 1101 paints a raster image at image plane 180. Scanning projector 1101 includes one or more pixel drive generator components and DACs as described above with reference to previous figures. Scanning projector 1101 may be any projection apparatus described herein.

Scanning projector 1101 may receive image data from any image source. For example, in some embodiments, scanning projector 1101 includes memory that holds still images. In other embodiments, scanning projector 1101 includes memory that includes video images. In still further embodiments, scanning projector 1101 displays imagery received from external sources such as connectors, wireless interface 1110, a wired interface, or the like.

Wireless interface 1110 may include any wireless transmission and/or reception capabilities. For example, in some embodiments, wireless interface 1110 includes a network interface card (NIC) capable of communicating over a wireless network. Also for example, in some embodiments, wireless interface 1110 may include cellular telephone capabilities. In still further embodiments, wireless interface 1110 may include a global positioning system (GPS) receiver. One skilled in the art will understand that wireless interface 1110 may include any type of wireless communications capability without departing from the scope of the present invention.

Processor 1120 may be any type of processor capable of communicating with the various components in mobile device 1100. For example, processor 1120 may be an embedded processor available from application specific integrated circuit (ASIC) vendors, or may be a commercially available microprocessor. In some embodiments, processor 1120 provides image or video data to scanning projector 1101. The image or video data may be retrieved from wireless interface 1110 or may be derived from data retrieved from wireless interface 1110. For example, through processor 1120, scanning projector 1101 may display images or video received directly from wireless interface 1110. Also for example, processor 1120 may provide overlays to add to images and/or video received from wireless interface 1110, or may alter stored imagery based on data received from wireless interface 1110 (e.g., modifying a map display in GPS embodiments in which wireless interface 1110 provides location coordinates).

Figure 12:
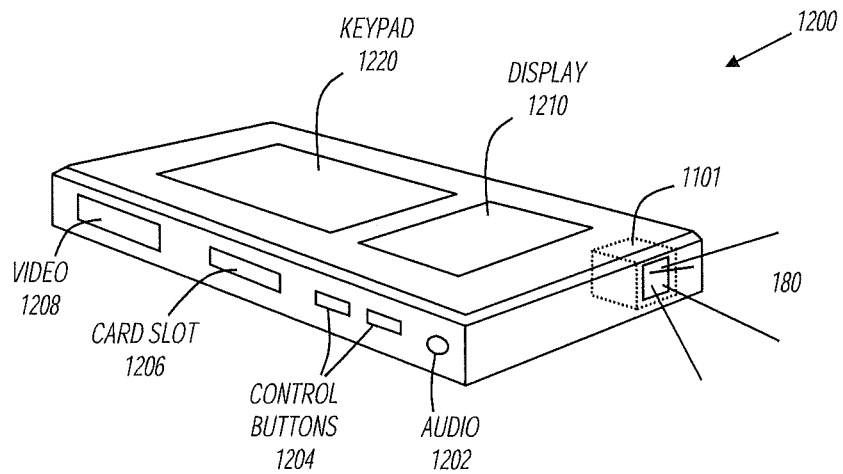
FIG. 12 shows a mobile device in accordance with various embodiments of the present invention.

FIG. 12 shows a mobile device in accordance with various embodiments of the present invention. Mobile device 1200 may be a hand held projection device with or without communications ability. For example, in some embodiments, mobile device 1200 may be a handheld projector with little or no other capabilities. Also for example, in some embodiments, mobile device 1200 may be a device usable for communications, including for example, a cellular phone, a smart phone, a personal digital assistant (PDA), a global positioning system (GPS) receiver, or the like. Further, mobile device 1200 may be connected to a larger network via a wireless (e.g., WiMax) or cellular connection, or this device can accept data messages or video content via an unregulated spectrum (e.g., WiFi) connection.

Mobile device 1200 includes scanning projector 1101 to create an image with light at image plane 180. Mobile device 1200 also includes many other types of circuitry; however, they are intentionally omitted from FIG. 12 for clarity.

Mobile device 1200 includes display 1210, keypad 1220, audio port 1202, control buttons 1204, card slot 1206, and audio/video (A/V) port 1208. None of these elements are essential. For example, mobile device 1200 may only include scanning projector 1101 without any of display 1210, keypad 1220, audio port 1202, control buttons 1204, card slot 1206, or A/V port 1208. Some embodiments include a subset of these elements. For example, an accessory projector product may include scanning projector 1101, control buttons 1204 and A/V port 1208.

Display 1210 may be any type of display. For example, in some embodiments, display 1210 includes a liquid crystal display (LCD) screen. Display 1210 may always display the same content projected at image plane 180 or different content. For example, an accessory projector product may always display the same content, whereas a mobile phone embodiment may project one type of content at image plane 180 while displaying different content on display 1210. Keypad 1220 may be a phone keypad or any other type of keypad.

A/V port 1208 accepts and/or transmits video and/or audio signals. For example, A/V port 1208 may be a digital port that accepts a cable suitable to carry digital audio and video data such as a high definition multimedia interface (HDMI) port. Further, A/V port 1208 may include RCA jacks to accept composite inputs. Still further, A/V port 1208 may include a VGA connector to accept analog video signals. In some embodiments, mobile device 1200 may be tethered to an external signal source through A/V port 1208, and mobile device 1200 may project content accepted through A/V port 1208. In other embodiments, mobile device 1200 may be an originator of content, and A/V port 1208 is used to transmit content to a different device.

Audio port 1202 provides audio signals. For example, in some embodiments, mobile device 1200 is a media player that can store and play audio and video. In these embodiments, the video may be projected at image plane 180 and the audio may be output at audio port 1202. In other embodiments, mobile device 1200 may be an accessory projector that receives audio and video at A/V port 1208. In these embodiments, mobile device 1200 may project the video content at image plane 180, and output the audio content at audio port 1202.

Mobile device 1200 also includes card slot 1206. In some embodiments, a memory card inserted in card slot 1206 may provide a source for audio to be output at audio port 1202 and/or video data to be projected at image plane 180. Card slot 1206 may receive any type of solid state memory device, including for example, Multimedia Memory Cards (MMCs), secure digital (SD) memory cards, and microSD cards. The foregoing list is meant to be exemplary, and not exhaustive.

Figure 13:
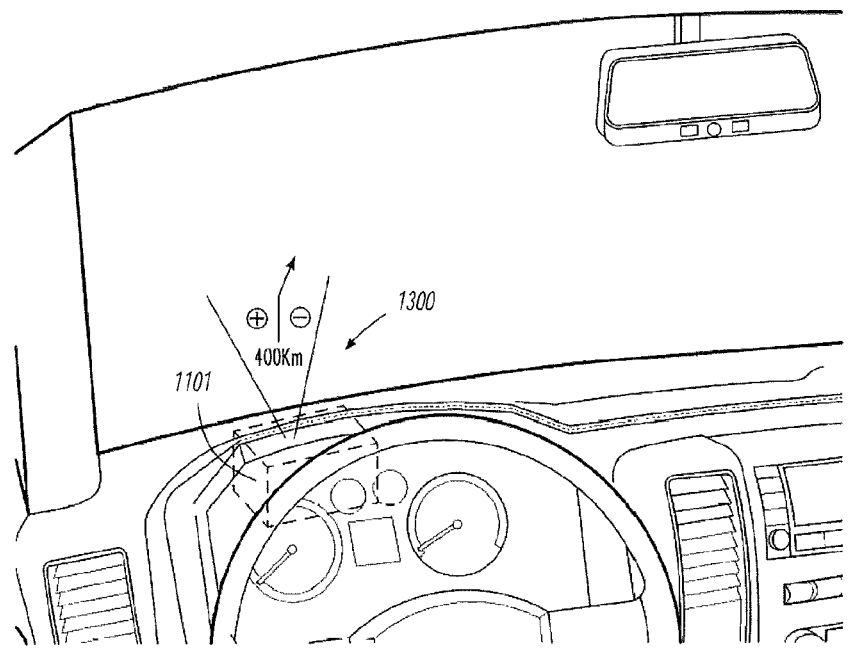
FIG. 13 shows a head-up display system in accordance with various embodiments of the invention.

FIG. 13 shows a head-up display system in accordance with various embodiments of the invention. Projector 1101 is shown mounted in a vehicle dash to project the head-up display at 1300. Although an automotive head-up display is shown in FIG. 13, this is not a limitation of the present invention. For example, various embodiments of the invention include head-up displays in avionics application, air traffic control applications, and other applications.

Figure 14:
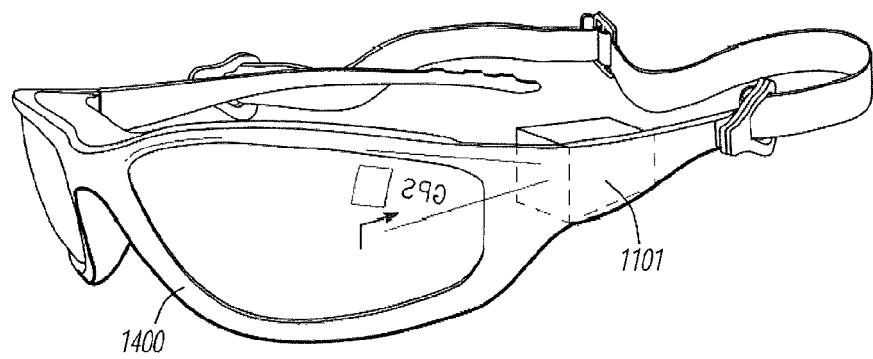
FIG. 14 shows eyewear in accordance with various embodiments of the invention.

FIG. 14 shows eyewear in accordance with various embodiments of the invention. Eyewear 1400 includes projector 1101 to project a display in the eyewear's field of view. In some embodiments, eyewear 1400 is see-through and in other embodiments, eyewear 1400 is opaque. For example, eyewear may be used in an augmented reality application in which a wearer can see the display from projector 1101 overlaid on the physical world. Also for example, eyewear may be used in a virtual reality application, in which a wearer's entire view is generated by projector 1101. Although only one projector 1101 is shown in FIG. 14, this is not a limitation of the present invention. For example, in some embodiments, eyewear 1400 includes two projectors; one for each eye.

Figure 15:
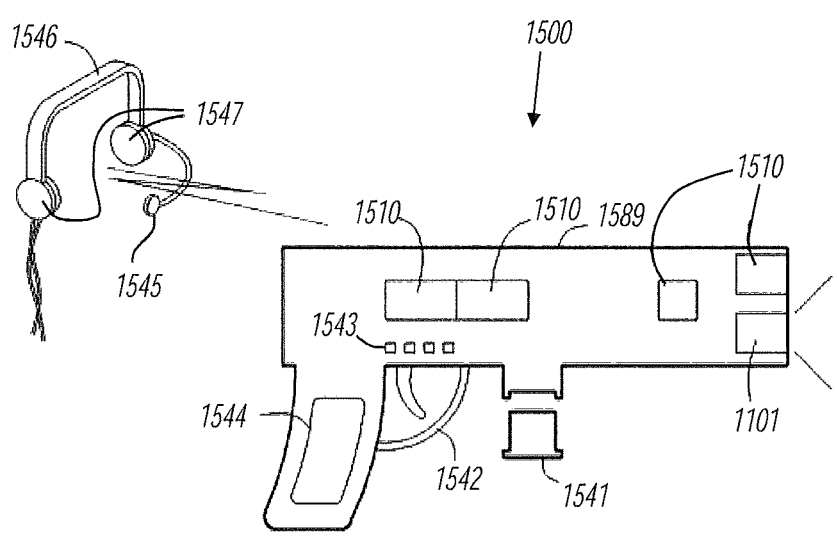
FIG. 15 shows a gaming apparatus in accordance with various embodiments of the present invention.

FIG. 15 shows a gaming apparatus in accordance with various embodiments of the present invention. Gaming apparatus 1500 allows a user or users to observe and interact with a gaming environment. The game is navigated based on the motion, position or orientation of gaming apparatus 1500, an apparatus that includes projection apparatus 1101. Other control interfaces, such as manually-operated buttons, foot pedals, or verbal commands, may also contribute to navigation around, or interaction with the gaming environment. For example, in some embodiments, trigger 1542 contributes to the illusion that the user or users are in a first person perspective video game environment, commonly known as a "first person shooter game." Because the projected display can be controlled by the gaming application in combination with the user's movement, gaming apparatus 1500 creates a highly believable or "immersive" environment for these users.

Many other first person perspective simulations can also be created by gaming apparatus 1500, for such activities as 3D seismic geo-prospecting, spacewalk planning, jungle canopy exploration, automobile safety instruction, medical education, etc. Tactile interface 1544 may provide a variety of output signals, such as recoil, vibration, shake, rumble, etc. Tactile interface 1544 may also include a touch-sensitive input feature, such as a touch sensitive display screen or a display screen that requires a stylus. Additional tactile interfaces, for example, input and/or output features for a motion sensitive probe are also included in various embodiments of the present invention.

Gaming apparatus 1500 may also include audio output devices, such as integrated audio speakers, remote speakers, or headphones. These sorts of audio output devices may be connected to gaming apparatus 1500 with wires or through a wireless technology. For example, wireless headphones 1546 provide the user with sound effects via a Bluetooth connection, although any sort of similar wireless technology could be substituted freely. In some embodiments, wireless headphones 1546 may include microphone 1545 or binaural microphone 1547, to allow multiple users, instructors, or observers to communicate. Binaural microphone 1547 typically includes microphones on each ear piece, to capture sounds modified by the user's head shadow. This feature may be used for binaural hearing and sound localization by other simulation participants.

Gaming apparatus 1500 may include any number of sensors 1510 that measure distance, ambient brightness, motion, position, orientation, and the like. For example, gaming apparatus 1500 may detect absolute heading with a digital compass, and detect relative motion with an x-y-z gyroscope or accelerometer. In some embodiments, gaming apparatus 1500 also includes a second accelerometer or gyroscope to detect the relative orientation of the device, or its rapid acceleration or deceleration. In other embodiments, gaming apparatus 1500 may include a Global Positioning Satellite (GPS) sensor, to detect absolute position as the user travels in terrestrial space.

Gaming apparatus 1500 may include battery 1541 and/or diagnostic lights 1543. For example, battery 1541 may be a rechargeable battery, and diagnostic lights 1543 could indicate the current charge of the battery. In another example, battery 1541 may be a removable battery clip, and gaming apparatus 1500 may have an additional battery, electrical capacitor or super-capacitor to allow for continued operation of the apparatus while the discharged battery is replaced with a charged battery. In other embodiments, diagnostic lights 1543 can inform the user or a service technician about the status of the electronic components included within or connected to this device. For example, diagnostic lights 1543 may indicate the strength of a received wireless signal, or the presence or absence of a memory card. Diagnostic lights 1543 could also be replaced by any small screen, such as an organic light emitting diode or liquid crystal display screen. Such lights or screens could be on the exterior surface of gaming apparatus 1500, or below the surface, if the shell for this apparatus is translucent or transparent.

Other components of gaming apparatus 1500 may be removable, detachable or separable from this device. For example, the projection apparatus 1101 may be detachable or separable from gaming housing 1549. In some embodiments, the subcomponents of the projection apparatus 1101 may be detachable or separable from gaming housing 1549, and still function.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A scanning laser projector comprising:
    a laser light source;
    a scanning mirror to reflect light from the laser light source in a sinusoidal pattern on at least one axis;
    a digital-to-analog converter (DAC) to receive a fixed frequency DAC clock and to receive a digital drive signal representing pixels and to drive the laser light source with an analog signal; and
    a pixel value generator that generates the digital drive values, wherein the digital drive signal occupies fewer periods of the fixed frequency DAC clock when an angular velocity of the beam slows.

2. The scanning laser projector of claim 1 wherein the digital drive signal occupies fractional periods of the fixed frequency DAC clock.

3. The scanning laser projector of claim 1 wherein the digital drive signal occupies a varying duration for different output pixels.

4. The scanning laser projector of claim 3 wherein the digital drive signal is driven to a higher amplitude when the duration is lower.

5. The scanning laser projector of claim 1 wherein the DAC includes return-to-zero (RTZ) functionality, and the pixel value generator drives the DAC with control signals to implement RTZ.

6. The scanning laser projector of claim 5 wherein the pixel value generator applies an amplitude multiplier to the digital drive values when RTZ is used to blank portions of the digital drive signal.

7. A scanning laser projector that resonantly scans a modulated laser beam on a first axis to display pixels, wherein a duty cycle of the laser beam modulation is reduced as the beam moves off center on the first axis.

8. The scanning laser projector of claim 7 wherein the duty cycle is reduced by driving laser light sources for fewer periods of a fixed frequency clock.

9. The scanning laser projector of claim 7 wherein the duty cycle is reduced by driving laser light sources for fractional periods of a fixed frequency clock.

10. The scanning laser projector of claim 9 wherein the amplitude of the modulated laser beam is increased when laser light sources are driven for fractional periods of the fixed frequency clock.

11. A scanning laser projector that resonantly scans a modulated laser beam on a first axis to display pixels, wherein a duty cycle of the laser beam modulation is reduced as an angular velocity of the beam slows.

12. The scanning laser projector of claim 11 wherein the amplitude of the modulated laser beam is increased when the duty cycle decreases.

13. The scanning laser projector of claim 11 comprising a digital-to-analog converter (DAC) to drive a laser light source for a number of periods of a fixed frequency clock, wherein each pixel is painted with an equal number of periods.

14. The scanning laser projector of claim 11 comprising a digital-to-analog converter (DAC) to drive a laser light source for a number of periods of a fixed frequency clock, wherein not every pixel is painted with an equal number of periods.

15. The scanning laser projector of claim 11 wherein the duty cycle is reduced by driving laser light sources for fewer periods of a fixed frequency clock.

16. The scanning laser projector of claim 11 wherein the duty cycle is reduced by driving laser light sources for fractional periods of a fixed frequency clock.

17. The scanning laser projector of claim 16 wherein the amplitude of the modulated laser beam is increased when laser light sources are driven for fractional periods of the fixed frequency clock.

18. A mobile device comprising:
    a wireless interface capable of receiving video information; and
    a scanning laser projector to display the video information, the scanning laser projector including a scanning mirror that resonantly scans a modulated laser beam on a first axis to paint pixels, wherein a duty cycle of the laser beam modulation is reduced as an angular velocity of the beam slows.

19. The mobile device of claim 18 wherein the mobile device comprises a mobile phone.

20. The mobile device of claim 18 wherein the mobile device comprises a gaming device.

* * * * *